United States Patent [19]
Gaag et al.

[11] Patent Number: 5,658,401
[45] Date of Patent: Aug. 19, 1997

[54] COPPER-ZINC ALLOY

[75] Inventors: Norbert Gaag; Peter Ruchel, both of Lauf, Germany

[73] Assignee: Diehl GmbH & Co., Nurnberg, Germany

[21] Appl. No.: 580,536

[22] Filed: Dec. 29, 1995

Related U.S. Application Data

[63] Continuation of Ser. No. 338,027, Nov. 14, 1994, abandoned.

[30] Foreign Application Priority Data

Nov. 18, 1993 [DE] Germany .................. 43 39 426.4

[51] Int. Cl.$^6$ .................................................. C22C 9/04
[52] U.S. Cl. .......................... 148/434; 148/413; 148/419; 148/435; 148/436; 148/441; 148/442; 420/477; 420/478; 420/480; 420/481; 420/485; 420/486; 420/515; 420/521; 420/587
[58] Field of Search ............................. 148/413, 419, 148/434, 442, 435, 436, 441; 420/479, 480, 481, 515, 521, 582, 587, 477, 478, 485, 486

[56] References Cited

U.S. PATENT DOCUMENTS

| | | | |
|---|---|---|---|
| 1,762,871 | 6/1930 | Lytle ................................ | 420/481 |
| 4,362,579 | 12/1982 | Tsuji ................................ | 420/481 |
| 4,954,187 | 9/1990 | Gaag et al. ..................... | 148/413 |
| 5,004,581 | 4/1991 | Takagi et al. ................... | 420/487 |

FOREIGN PATENT DOCUMENTS 725576  1/1966  Canada .......................... 420/481

*Primary Examiner*—John Sheehan
*Attorney, Agent, or Firm*—Scully, Scott, Murphy & Presser

[57] ABSTRACT

A copper-zinc alloy for semi-finished products and articles which are highly loaded and subjected to extreme wear especially synchronizing rings. The alloy possesses a composition of 40 to 65% Cu, 8 to 25% Ni, 2.5 to 5% Si, 0 to 3% Al, 0 to 3% Fe, 0 to 2% Mn and 0 to 2% Pb, with the balance being zinc and unavoidable impurities. The Ni:Si ratio is about 3 to 5:1, and the structure consists of at least 75% β-phase, with the balance α-phase, in the absence of a γ-phase. Nickel silicides occur predominantly as a round intermetallic phase. The alloy provides quite substantially higher levels of resistance to wear.

6 Claims, No Drawings

COPPER-ZINC ALLOY

This is a continuation of application Ser. No. 08/338,027 filed on Nov. 14, 1994, now abandoned.

BACKGROUND OF THE INVENTION

1. Field of the Invention

The present invention relates to a copper-zinc alloy for semi-finished materials and articles which are highly loaded or stressed and subjected to extreme wear, in particular materials for synchronizing rings.

A high load-carrying capability, in effect, durability, a high coefficient of friction and a high resistance to wear are characterizing parameters which are of particular significance with regard to synchronizing rings utilized in motor vehicle or automotive transmissions. A high coefficient of friction is of importance in the effectuation of fast and precise gear shifting; in essence, to enable a comfortable shifting, and a high degree of resistance to wear is of importance from the standpoint of the service life of the synchronizing ring.

Because of the progressively increasing power of motor vehicle or automotive engines, the demands which are placed on synchronizing rings are similarly increasing. However, in view of the increasing pressure on costs encountered in the manufacture of such synchronizing rings, there arises more frequently the query as to whether the coatings of molybdenum which are applied in many instances in view of the resistance to wear thereof could not be eliminated through the use of an improved alloy.

2. Description of the Prior Art

In essence, the present invention represents an improvement over an alloy as described in the German Patent No. 37 35 783, which is commonly assigned to the assignee of the present application. Pursuant to the German patent, the therein disclosed alloy comprises about 50 to 65% copper, 1 to 6% aluminum, 0.5 to 5% silicon, 5 to 8% nickel and selectively 0 to 1% iron, 0 to 2% lead, with the balance being zinc. In the foregoing alloy, the nickel is present predominantly in an intermetallic compound with silicon in the form of nickel silicides which are distributed uniformly and finely in a rounded-off form.

SUMMARY OF THE INVENTION

It is an object of the present invention to provide an alloy which is a multiplicity of times improved from the standpoint of wear value than an alloy of the above-described type which per se is already of a good quality.

Accordingly, in order to achieve the foregoing object, the invention provides for an alloy which essentially comprises about 43 to 65% Cu, 8 to 25% Ni, 2.5 to 5% Si, 0 to 3% Al, 0 to 3% Fe, 0 to 2% Mn, 0 to 2% Pb, with the balance being zinc and unavoidable impurities; wherein the Ni-Si ratio is 3 to 5:1, and in which the structure comprises at least 75% of β-components, the balance being α-components; however, no γ-components, and the nickel silicides are present as a primarily rounded-off intermetallic phase.

A preferred composition is such that it comprises 40 to 52% Cu, 10 to 17% Ni, 3 to 4.2% Si, 0 to 1.5% Al, 0 to 1% Fe, 0 to 1% Mn, 0 to 1% Pb, with the balance being zinc and unavoidable impurities, and wherein the structure comprises at least 80% of β-components, with the balance being α-components.

Especially preferred is a composition such that it comprises 44 to 49% Cu, 13.5 to 16% Ni, 3.2 to 3.9% Si, with the balance being zinc and unavoidable impurities, and wherein the structure comprises a 100% β-phase.

The constituents of the alloys specified in the present specification are in percentages by weight.

The alloy which is provided for by the invention, surprisingly evidences an improvement in the wear value by a factor of 3 to 5 in comparison with the above-mentioned known alloy, and thus presents good possibilities of being able to eliminate the need for an additional coating of molybdenum in the instance of synchronizing rings.

DETAILED DESCRIPTION

An essential aspect in obtaining these excellent properties of the inventive alloy resides in the very high content of nickel and silicon, which leads to the presence of nickel silicides in the matrix, at a volumetric content of about 35%. Another essential aspect is that the structure is devoid of any γ-phase and primarily consists of β-phase.

The improvements which are attainable by means of the invention are surprising to the extent since, heretofore, such a high volumetric proportion of silicides from other silicide-forming agents was not possible because of coarsening and clustering of the silicides, and lead to the embrittlement of the matrix structure and resultingly poor machinability. Consequently, there were never made any attempts heretofore to utilize such high constituents of nickel and silicon in an alloy which was intended to possess the properties set forth hereinabove. Only through a correlation of all of the parameters, especially those of the other elements, which was previously unknown, did it become possible to produce a good processable and workable alloy possessing a uniform structure or matrix and incorporating the indicated properties. In this connection it is particularly important that the recognition of the addition of aluminum be determined from the standpoint of resistance to wear, and can only be considered expedient to a slight degree with regard to a minor increase in the coefficient of friction.

As already previously mentioned, the absence of γ-structure is an essential aspect. Important is that the β-structure reigns quite predominantly; namely, at least 75%, preferably even in excess of 85%. The balance is then the α-structure.

It is important for the resistance to wear to provide a basically high constituent of silicon which, combined through a factor of about 3 to 5, necessitates a correspondingly high nickel content. In order to prevent the undesired γ-phase from occurring, silicon is not permitted to be present in a free form in the matrix, but must be completely bound by the nickel. Small amounts of free nickel are not disturbing, but the resistance to wear has a tendency to be reduced by the presence of free nickel. The ratio of nickel to silicon is especially preferably at about 3.5 to 4. In the event that the ratio of Ni:Si deviates from the ratio of between about 3 to 5:1 either upwardly or downwardly, in any case the resistance to wear drops off, while at values above 5 the good workability also clearly falls off. The specified alloy limits and factors are essential, but naturally are not completely freely combinable. At boundary or limiting ranges, alloys possessing the mentioned properties can still only be obtained through skillful combinations. In the case of alloy 8 from Table 1 set forth hereinbelow, there would be required; for example, a high nickel content in order to avoid any γ-phase.

Additions of iron, manganese, and lead adversely affect the resistance to wear. However, lead in small amounts may be useful for the machinability of the alloy.

During the production of the test alloys, it was also determined that there can be considered additions of chromium and zirconium of up to 0.2% or cobalt of up to 2%; however, which do not afford any improvement in the properties of the alloys.

The state of the art in the field of Cu-Zn-Ni-Si alloys, which for the remainder is extensively discussed in the previously mentioned German patent specification, pertains period of 4 hours, is considered to be advantageous but not as being absolutely necessary.

The alloy can also be cast in the form of tubular members, and thereafter forged at 650° C. to 750° C. Instead of cooling in air, cooling under compressed air is possible in both alternative methods of production.

TABLE 1

Wear tests on the Reichert wear weighing apparatus (raceway roughness, $R_{z_D}$ 6 μm)

| Alloy No. | COMPOSITION | | | | | | | | Ni/Si | Wear resistance km/g | Coefficient of friction μ |
|---|---|---|---|---|---|---|---|---|---|---|---|
| | Cu | Ni | Si | Fe | Mn | Al | Pb | Zn | | | |
| 1 | 44.61 | 15.9 | 3.46 | 0.05 | 0.03 | — | 0.39 | balance | 4.6 | 1056 | 0.11 |
| 2 | 47.11 | 13.9 | 3.78 | 0.04 | 0.03 | — | 0.31 | balance | 3.7 | 1028 | 0.11 |
| 3 | 49.23 | 14.8 | 3.79 | 0.04 | 0.03 | — | 0.40 | balance | 3.9 | 956 | 0.11 |
| 4 | 49.75 | 10.7 | 3.37 | 0.04 | 0.02 | — | 0.46 | balance | 3.2 | 804 | 0.12 |
| 5 | 46.22 | 14.8 | 3.76 | 0.04 | 0.04 | 1.90 | 0.43 | balance | 3.9 | 215 | 0.12 |
| 6 | 45.56 | 15.1 | 3.63 | 2.21 | 0.03 | — | 0.42 | balance | 4.2 | 612 | 0.11 |
| 7 | 46.21 | 14.8 | 3.45 | 0.06 | 1.69 | — | 0.36 | balance | 4.3 | 602 | 0.11 |
| 8 | 42.77 | 14.2 | 4.5 | 0.09 | 0.03 | — | 0.02 | balance | 3.2 | — | γ-phase — |
| 9 | 58 | — | 0.5 | 0.4 | 2.0 | 1.6 | 0.5 | balance | — | 80 | 0.10 |
| 10 | 55 | 7 | 2.0 | 0.7 | — | 4.0 | 0.3 | balance | 3.5 | 223 | 0.11 | only to alloys with low contents of nickel and silicon, or at least low contents of nickel silicides. It is to be again repeated that the surprising properties of the invention are predicated on the high content of nickel and silicon, and thereby on a very high content of nickel silicides in the matrix. This can also be ascertained from Table 1, in which various alloys pursuant to the invention are compared with a standard alloy and the alloy pursuant to the German patent specification previously referred to. The alloys 1 to 7 in Table 1 elucidate the composition and data of the inventive alloy, the alloy 8 being an alloy in which a matrix structure with a higher γ-component is markedly emphasized. The last-mentioned alloy 10 relates to a composition as is known from the above-mentioned German patent in the state of the art. It can be recognized from this Table 1 that the especially preferred alloys 1 to 3 are better from the standpoint of wear behavior by a factor of from 4 to 5 than the previously described known alloy. In that respect, the coefficient of friction has remained substantially constant over all of the investigated alloys.

It can also be ascertained from Table 1 that additions of iron, manganese or aluminum, especially the last-mentioned, clearly reduce the resistance to wear; however, the addition of aluminum provides the advantage of increasing the coefficient of friction. However, this alloy is overall not any better than the alloy 10 pursuant to the state of the art. Furthermore, from Table 1 there can be seen that the silicon content may fluctuate only within close bounds. The choice of the ratio of nickel:silicon is not quite as critical, and then leads to slightly different contents of nickel.

EXAMPLE

The test alloys were produced and worked as follows:

Casting was effected at a casting temperature of about 1050° C. into a chill mold. Thereafter, a hot deformation operation was effected through extrusion at 650° C. to 750° C. After cooling in air, forging was carried out at 650° C. to 750° C. Thereafter, cooling was implemented in air. Subsequently, an aging step, preferably at 250° C. for a

What is claimed is:

1. A copper-zinc wrought alloy for semi-finished products and articles which are highly loaded and subjected to extreme wear and which possess a high coefficient of friction wherein said wrought alloy comprises 40 to 65% Cu, greater than 8 to 25 Ni, 2.5 to 5% Si, 0 to 3% Al, 0 to 3% Fe, 0 to 2% Mn, 0 to 2% Pb, all percentages being by weight, with the balance being zinc and unavoidable impurities, the Ni:Si ratio is from about 3 to 5:1, and wherein the structure of the wrought alloy comprises at least 75% of a β-phase, and an absence of a γ-phase, and contains about 35%, by volume, nickel silicides which are present as a predominantly round intermetallic phase.

2. A copper-zinc wrought alloy as claimed in claim 1, wherein said wrought alloy comprises 43 to 52% Cu, 10 to 17% Ni, 3 to 4.2% Si, 0 to 1.5% Al, 0 to 1% Fe, 0 to 1% Mn, and 0 to 1% Pb, with the balance being zinc and unavoidable impurities, and wherein the wrought alloy structure consists of at least 80% of β-phase, with the balance being an α-phase.

3. A copper-zinc wrought alloy as claimed in claim 1 or 2, wherein the wrought alloy comprises 44 to 49% Cu, 13.5 to 16% Ni, and 3.2 to 3.9% Si, with the balance being zinc and unavoidable impurities, and wherein the alloy structure comprises a 100% β-phase.

4. A wrought alloy semifinished product or article which is subject to being highly loaded and subject to extreme wear and has a high coefficient of friction, wherein said product or article is a wrought alloy comprising 40 to 65% Cu, greater than 8 to 25% Ni, 2.5 to 5% Si, 0 to 3% Al, 0 to 3% Fe, 0 to 2% Mn and 0 to 2% Pd, with the balance being zinc and unavoidable impurities, wherein the Ni:Si ratio is from 3 to 5:1 and the wrought alloy structure comprises at least 75% of a β-phase, with the balance being an α-phase, and with the absence of a γ-phase, and contains about 35%, by volume, of nickel silicides which are present as a predominantly round intermetallic phase.

5. A semifinished product or article as claimed in claim 4, wherein said wrought alloy comprises 43 to 52% Cu, 10 to 17% Ni, 3 to 4.2% Si, 0 to 1.5% Al, 0 to 1% Fe, 0 to 1% Mn, and 0 to 1% Pb, with the balance being zinc and unavoidable impurities, and wherein the wrought alloy structure consists of at least 80% of β-phase, with the balance being α-phase.

6. A semifinished product or article as claimed in claim 4, wherein said wrought alloy comprises 44 to 49% Cu, 13.5 to 16% Ni, and 3.2 to 3.9% Si, with the balance being zinc and unavoidable impurities, and wherein the wrought alloy structure comprises a 100% β-phase.

* * * * *